(12) United States Patent
Shibata et al.

(10) Patent No.: US 9,981,504 B2
(45) Date of Patent: May 29, 2018

(54) PNEUMATIC TIRE

(75) Inventors: Hirokazu Shibata, Hiratsuka (JP); Jun Matsuda, Hiratsuka (JP); Yoshiaki Hashimura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 585 days.

(21) Appl. No.: 14/352,056

(22) PCT Filed: Jun. 1, 2012

(86) PCT No.: PCT/JP2012/064293
§ 371 (c)(1),
(2), (4) Date: Apr. 15, 2014

(87) PCT Pub. No.: WO2013/061646
PCT Pub. Date: May 2, 2013

(65) Prior Publication Data
US 2015/0158336 A1      Jun. 11, 2015

(30) Foreign Application Priority Data

Oct. 26, 2011   (JP) ................................. 2011-235207

(51) Int. Cl.
*B60C 5/14* (2006.01)
*B60C 1/00* (2006.01)
(Continued)

(52) U.S. Cl.
CPC .............. *B60C 1/0008* (2013.01); *B60C 5/14* (2013.01); *B60C 5/142* (2013.01); *B60C 15/06* (2013.01);
(Continued)

(58) Field of Classification Search
CPC ......... B60C 1/0008; B60C 5/14; B60C 5/142; B60C 15/06; B60C 2005/145
See application file for complete search history.

(56) References Cited

U.S. PATENT DOCUMENTS

| 6,534,578 B1 | 3/2003 | Daikai et al. |
| 2009/0131592 A1* | 5/2009 | Sakai ...................... B32B 25/08 525/190 |

(Continued)

FOREIGN PATENT DOCUMENTS

| EP | 0842793 A1 * | 5/1998 | ............... B60C 5/14 |
| JP | H09-239905 | 9/1997 | |

(Continued)

OTHER PUBLICATIONS

Machine Translation of JP2009248770, EPO translation tool, translation performed on Dec. 29, 2016.*
(Continued)

*Primary Examiner* — Nicholas E Hill
(74) *Attorney, Agent, or Firm* — Thorpe North & Western (57) ABSTRACT

A pneumatic tire comprising: an inner liner layer formed from a thermoplastic resin or a thermoplastic elastomer composition obtained by blending a thermoplastic resin with an elastomer; a coating rubber layer; and a tie rubber layer; the pneumatic tire being configured to effectively prevent separation of the inner liner layer. In a pneumatic tire comprising an inner liner layer formed from a thermoplastic resin or a thermoplastic elastomer composition obtained by blending a thermoplastic resin with an elastomer, a tie rubber layer, and a coating rubber layer, the coating rubber layer and the inner liner layer are disposed in a manner such that the coating rubber layer and the inner liner layer overlap each other, and a rubber composition in at least a region of the coating rubber layer where the coating rubber layer and the inner liner layer overlap has an adhesion to the inner liner layer.

22 Claims, 4 Drawing Sheets

(51) Int. Cl.
    *C08L 77/02* (2006.01)
    *C08L 77/06* (2006.01)
    *C08L 7/00* (2006.01)
    *C08L 9/00* (2006.01)
    *C08L 23/28* (2006.01)
    *C08L 51/06* (2006.01)
    *B60C 15/06* (2006.01)
    *C08L 25/16* (2006.01)
    *C09D 109/00* (2006.01)
    *C09D 109/06* (2006.01)
    *C08L 21/00* (2006.01)
    *C08L 61/06* (2006.01)
    *C08L 61/12* (2006.01)
    *C08K 5/13* (2006.01)

(52) U.S. Cl.
    CPC ....... *C08L 7/00* (2013.01); *C08L 9/00* (2013.01); *C08L 23/283* (2013.01); *C08L 25/16* (2013.01); *C08L 51/06* (2013.01); *C08L 77/02* (2013.01); *C08L 77/06* (2013.01); *C09D 109/00* (2013.01); *C09D 109/06* (2013.01); *B60C 2005/145* (2013.01); *C08K 5/13* (2013.01); *C08L 21/00* (2013.01); *C08L 61/06* (2013.01); *C08L 61/12* (2013.01); *C08L 2205/03* (2013.01)

(56) References Cited

U.S. PATENT DOCUMENTS

2011/0198011 A1* 8/2011 Matsuda ............... B60C 5/14
                                          152/543
2013/0078477 A1* 3/2013 Shibata ................. B32B 25/08
                                          428/475.5

FOREIGN PATENT DOCUMENTS

| JP | H10-081108 | 3/1998 | |
|----|------------|--------|---|
| JP | 2001-049063 | 2/2001 | |
| JP | 2007-182146 | 7/2007 | |
| JP | 2009248770 A * | 10/2009 | |
| JP | 2011-052189 | 3/2011 | |
| WO | WO 2010053014 A1 * | 5/2010 | ............... B60C 5/14 |
| WO | WO 2011155547 A1 * | 12/2011 | ............ B32B 25/08 |

OTHER PUBLICATIONS

SIDS Initial Assessment Report for SIAM 16, dated May 27-30, 2003, UNEP Publication, 121 pages.*
Armstrong, TAPPI e-Newsletter, "New EVAL® EVOH Resins for Flexible Packaging," 2004, 12 pages.*
International Search Report dated Aug. 28, 2012, 4 pages, Japan.

* cited by examiner

PNEUMATIC TIRE

TECHNICAL FIELD

The present technology relates to a pneumatic tire comprising: an inner liner layer formed from a thermoplastic resin or a thermoplastic elastomer composition obtained by blending a thermoplastic resin with an elastomer; a coating rubber layer protecting a base surface of a bead portion; and a tie rubber layer. More particularly, the present technology relates to a pneumatic tire capable of effectively preventing separation of an inner liner layer.

BACKGROUND

Conventionally, an inner liner layer (air penetration preventing layer) formed from rubber having low gas permeability, such as halogenated butyl rubber, is provided on an inner surface of a pneumatic tire in order to prevent air leakage to maintain the tire air pressure constant. In consideration of this, it is proposed to use a film having low air permeability which contains, as a main component, a thermoplastic resin in the inner liner layer to reduce the weight of the pneumatic tire (for example, see Japanese Unexamined Patent Application Publication No. H10-081108A).

However, because the inner liner layer containing a thermoplastic resin as a main component does not always have a sufficient adhesion to rubber, there are concerns that failures may occur such as the inner liner layer being separated from its edge portion due to repeated deformation when traveling, oxidation deterioration, or repeated assembling/disassembling the tire from the rim. Therefore, there is a demand for enhancing the durability when using this type of inner liner layer.

SUMMARY

The present technology provides a pneumatic tire comprising: an inner liner layer formed from a thermoplastic resin or a thermoplastic elastomer composition obtained by blending a thermoplastic resin with an elastomer; a coating rubber layer protecting a base surface of a bead portion; and a tie rubber layer; and the pneumatic tire being capable of effectively preventing separation of the inner liner layer.

The pneumatic tire of the present technology may be a pneumatic tire comprising: an inner liner layer formed from a thermoplastic resin or a thermoplastic elastomer composition obtained by blending a thermoplastic resin with an elastomer, the inner liner layer being disposed on an inner side of a carcass layer; a tie rubber layer disposed between the inner liner layer and the carcass layer; and a coating rubber layer disposed on a bead portion to protect a base surface of the bead portion. The coating rubber layer and the inner liner layer are disposed in a manner such that the coating rubber layer and the inner liner layer overlap each other, and a rubber composition of the coating rubber layer, in at least a region where the coating rubber layer and the inner liner layer overlap, contains: a rubber component, a condensation product of a compound represented by Formula (1) below and formaldehyde, a methylene donor, and a vulcanizing agent. A compounded amount of the condensation product is from 0.5 to 20 parts by mass relative to 100 parts by mass of the rubber component. A proportion of a compounded amount of the methylene donor to the compounded amount of the condensation product is from 0.5 to 10.

Formula 1

(1)

In the formula, $R^1$, $R^2$, $R^3$, $R^4$, and $R^5$ are hydrogen, a hydroxyl group, or an alkyl group having from 1 to 8 carbons.

As a result of diligent research on the adhesion between a rubber layer and an inner liner layer formed from a thermoplastic resin or a thermoplastic elastomer composition, the present inventors have discovered that, by compounding, at a specific compounding ratio in a rubber composition, a condensation product having a phenol structure and a base component generating formaldehyde, and by adjusting the compounded amount of sulfur and a vulcanization accelerator, the adhesive strength at an interface between the rubber layer and the inner liner layer formed from a thermoplastic resin or a thermoplastic elastomer composition is significantly enhanced, and thus achieved the present technology.

Consequently, the present technology can enhance the adhesion at an interface between the coating rubber layer and the inner liner layer by disposing the coating rubber layer and the inner liner layer in a manner such that the coating rubber layer and the inner liner layer overlap each other as described above, and by making the rubber composition of the coating rubber layer, in at least a region where the coating rubber layer and the inner liner layer overlap, a rubber composition having excellent adhesion to the inner liner layer. As a result of this, the separation of the inner liner layer formed from a thermoplastic resin or a thermoplastic elastomer composition can be effectively prevented.

In the present technology, the coating rubber layer is disposed between the inner liner layer and the carcass layer, and a rubber composition of the tie rubber layer in at least a region where the tie rubber layer and the inner liner layer overlap preferably contains: a rubber component, a condensation product of a compound represented by the Formula (1) and formaldehyde, a methylene donor, and a vulcanizing agent; a compounded amount of the condensation product is from 0.5 to 20 parts by mass relative to 100 parts by mass of the rubber component; and a proportion of a compounded amount of the methylene donor to the compounded amount of the condensation product is from 0.5 to 10. By imparting the tie rubber layer with an adhesion to the inner liner layer in this manner, and by sandwiching the tie rubber layer and coating rubber layer in between the inner liner layer and the carcass layer, it is possible to adhere each of the layers without using an adhesive. As a result, the adhesive does not attach to scrap materials that are generated during the manufacture of the inner liner layer, and thus recyclability of the scrap materials is improved. In addition, since the process of applying an adhesive is not necessary, the manufacturing process can be simplified.

At this time, a position of an inner side edge in a radial direction of the inner liner layer is preferably set in a region not higher than 35% of a tire cross sectional height SH. Because of this, air leakage can be effectively suppressed.

Alternatively, in the present technology, the coating rubber layer is preferably disposed in a manner such that the coating rubber layer covers an inner side edge in the radial direction of the inner liner layer. By holding the edge of the inner liner layer using the coating rubber layer in this manner, the edge of the inner liner layer is not exposed on an inner surface of the tire, and thus the separation from this edge portion can be more effectively prevented.

At this time, a position of the inner side edge in the radial direction of the inner liner layer is preferably set in a region not higher than 35% of the tire cross sectional height SH. Because of this, air leakage can be effectively suppressed. In addition, an amount of overlap between the inner liner layer and the coating rubber layer is preferably greater than or equal to 5 mm and less than or equal to 10 mm. Because of this, the separation between the layers can be effectively prevented while reducing the amount of the coating rubber layer.

Furthermore, a rubber composition of the tie rubber layer in at least a region where the tie rubber layer and the inner liner layer overlap preferably contains: a rubber component, a condensation product of a compound represented by the Formula (1) and formaldehyde, a methylene donor, and a vulcanizing agent; a compounded amount of the condensation product is preferably from 0.5 to 20 parts by mass relative to 100 parts by mass of the rubber component; and a proportion of a compounded amount of the methylene donor to the compounded amount of the condensation product is preferably from 0.5 to 10. Because of this, the separation between the layers can be more effectively prevented by enhancing the adhesion between the inner liner layer and the tie rubber layer.

In the present technology, the rubber component can contain a diene rubber; the vulcanizing agent can be sulfur; and the rubber composition can be free of a vulcanization accelerator.

Alternatively, the rubber component can contain a diene rubber, the vulcanizing agent can be sulfur, and the rubber composition can further contain a vulcanization accelerator. In this case, a compounded amount of the condensation product is preferably greater than 3 parts by mass and less than or equal to 20 parts by mass relative to 100 parts by mass of the rubber component; and a compounded amount of the methylene donor is preferably greater than 1.5 parts by mass and less than or equal to 200 parts by mass relative to 100 parts by mass of the rubber component.

Alternatively, in the case where the rubber component contains a diene rubber, the vulcanizing agent is sulfur, and the rubber composition further contains a vulcanization accelerator; a compounded amount of the condensation product is preferably from 0.5 to 3 parts by mass relative to 100 parts by mass of the rubber component; a compounded amount of the methylene donor is preferably from 0.25 to 30 parts by mass relative to 100 parts by mass of the rubber component; a compounded amount of the sulfur is preferably less than 4 parts by mass relative to 100 parts by mass of the rubber component; and a compounded amount of the vulcanization accelerator is preferably greater than 0 parts by mass and less than 2.1 parts by mass relative to 100 parts by mass of the rubber component.

In the present technology, the vulcanization accelerator can be a compound having a sulfenamide structure; and a compounded amount of the compound having a sulfenamide structure can be greater than 0 parts by mass and less than 1.5 parts by mass. Furthermore, the rubber composition can contain, as vulcanization accelerators, a compound having a sulfenamide structure and a compound having a thiuram structure; and a compounded amount of the compound having a thiuram structure can be greater than 0 parts by mass and less than 0.6 parts by mass.

In the present technology, the thermoplastic resin is preferably at least one type selected from the group consisting of polyvinylalcohol, an ethylene-vinyl alcohol copolymer, nylon 6, nylon 66, nylon 11, nylon 12, nylon 610, nylon 612, nylon 6/66, nylon MXD6, and nylon 6T.

In the present technology, the thermoplastic elastomer composition is preferably a composition in which an elastomer component is dispersed in a thermoplastic resin component. The thermoplastic resin component is preferably at least one type selected from the group consisting of polyvinylalcohol, an ethylene-vinyl alcohol copolymer, nylon 6, nylon 66, nylon 11, nylon 12, nylon 610, nylon 612, nylon 6/66, nylon MXD6, and nylon 6T. The elastomer component is preferably at least one type selected from the group consisting of a brominated isobutylene-p-methylstyrene copolymer, a maleic anhydride-modified ethylene-α-olefin copolymer, an ethylene-glycidyl methacrylate copolymer, and a maleic anhydride-modified ethylene-ethylacrylate copolymer.

In the present technology, at least one of $R^1$, $R^2$, $R^3$, $R^4$, and $R^5$ in the Formula (1) is preferably an alkyl group having from 1 to 8 carbons, and the others are preferably hydrogens or alkyl groups having from 1 to 8 carbons.

In the present technology, the condensation product is preferably a compound represented by Formula 2:

Formula 2

(2)

in the formula, n is an integer from 1 to 5.

In the present technology, at least one of $R^1$, $R^2$, $R^3$, $R^4$, and $R^5$ in the Formula (1) is preferably a hydroxyl group, and the others are preferably hydrogens or alkyl groups having from 1 to 8 carbons.

In the present technology, the condensation product is preferably a compound represented by Formula 3:

Formula 3

(3)

wherein, m is an integer from 1 to 3.

In the present technology, the thermoplastic resin preferably contains an ethylene-vinyl alcohol copolymer having an ethylene content of 5 to 55 mol %; and a compounded amount of the ethylene-vinyl alcohol copolymer is preferably from 5 to 100 mass % of a total amount of the thermoplastic resin. Alternatively, the thermoplastic elastomer composition is preferably a composition in which an elastomer component is dispersed in a thermoplastic resin component. The thermoplastic resin component preferably contains an ethylene-vinyl alcohol copolymer having an ethylene content of 5 to 55 mol %. A compounded amount of the ethylene-vinyl alcohol copolymer is preferably from 5 to 100 mass % of a total amount of the thermoplastic resin component.

In the present technology, the methylene donor is preferably at least one type selected from the group consisting of modified etherified methylolmelamine, para-formaldehyde, hexamethylene tetramine, pentamethylene tetramine, and hexamethoxy methylmelamine.

In the present technology, the diene rubber is preferably styrene butadiene rubber.

DETAILED DESCRIPTION

Figure 1:
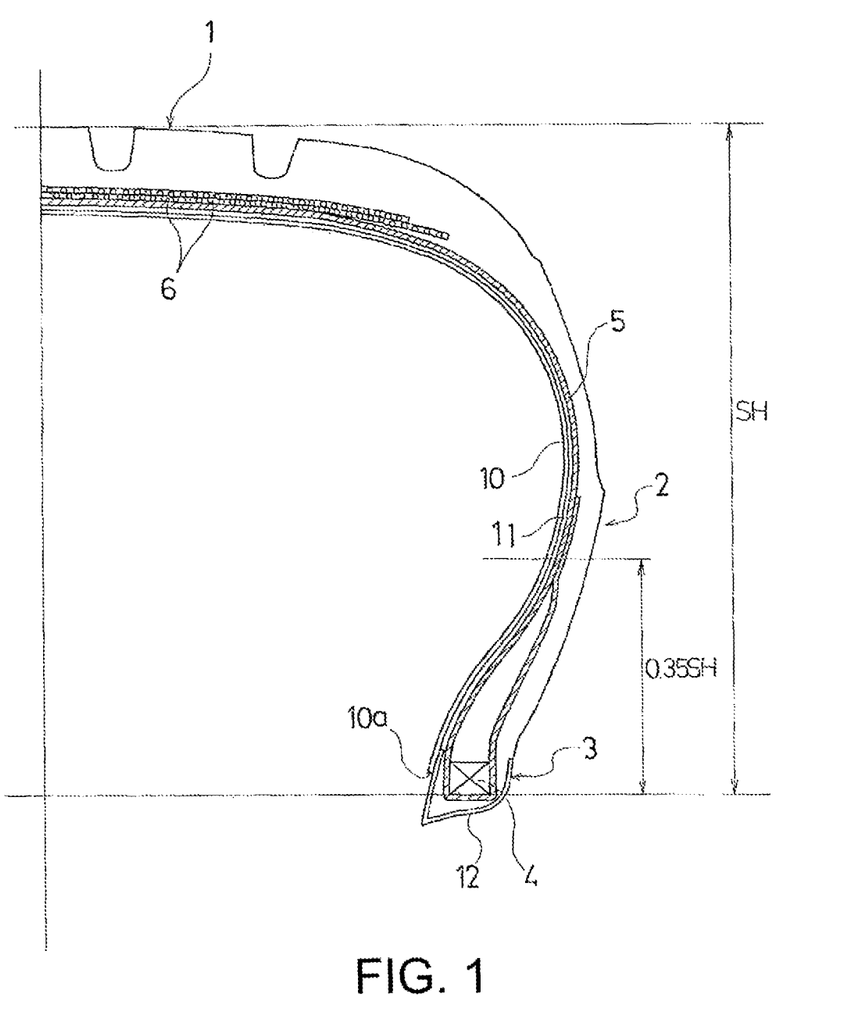
FIG. 1 is a meridian cross-sectional view illustrating one example of a pneumatic tire according to an embodiment of the present technology.

Detailed descriptions will be given below of a configuration of the present technology with reference to the accompanying drawings. FIG. 1 illustrates one example of a pneumatic tire according to an embodiment of the present technology.

In FIG. 1, 1 is a tread portion; 2 is a side wall portion; and 3 is a bead portion. A carcass layer 5 is mounted between a pair of left and right bead cores 4 embedded in the bead portion 3, and each of the both edges of the carcass layer 5 is folded around the bead core 4 from an inner side to an outer side of the tire. In the tread portion 1, a pair of upper and lower belt layers 6 is provided along an entire periphery of the tire on an outer side of the carcass layer 5. Also, on an inner side of the carcass layer 5, an inner liner layer 10, formed from a thermoplastic resin or a thermoplastic elastomer composition obtained by blending a thermoplastic resin with an elastomer, for preventing air permeation is attached using a tie rubber layer 11 as an adhesive layer. Furthermore, a base surface side of the bead portion 3 is provided with a coating rubber layer 12. The coating rubber layer 12 is disposed in a manner such that the coating rubber layer 12 covers the bead portion 3, and a part of the coating rubber layer 12 and a part of the inner liner layer 10 overlap each other. The coating rubber layer 12 is a so-called finishing layer, and, of course, may only consist of a rubber composition. In addition, the coating rubber layer 12 may also have a reinforcing material such as a textile embedded in the rubber composition, or may also be a coating rubber layer having short fibers compounded in the rubber composition.

In the pneumatic tire described above, by making the rubber composition in at least a region of the coating rubber layer 12 where the coating rubber layer 12 and the inner liner layer 10 overlap a specific rubber composition, described below, having an adhesion to the inner liner layer 10, the adhesion at an interface between the coating rubber layer 12 and the inner liner layer 10 can be enhanced, and as a result, the separation of the inner liner layer formed from a thermoplastic resin or a thermoplastic elastomer composition can be effectively prevented.

At this time, a position of an inner side edge 10a in a radial direction of the inner liner layer 10 is preferably set in a region not higher than 35% of the tire cross sectional height SH. When the position of the edge 10a in the radial direction is set more to an outer side in the radial direction than 35% of the tire cross sectional height SH, the air leakage prevention effect of the inner liner layer 10 becomes insufficient.

As described above, the configuration of each layer in the bead portion 3 can employ various configurations such as configurations illustrated in FIGS. 2 to 9 as long as the inner liner layer 10 and the coating rubber layer 12 having an adhesion to the inner liner layer 10 contact each other. FIGS. 2 to 9 are enlarged schematic views illustrating a bead portion 3 of the pneumatic tire described above.

Figure 2:
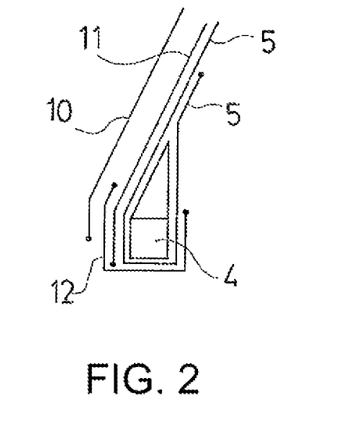
FIG. 2 is a schematic view illustrating a structure of a bead portion according to an embodiment of the present technology.
Figure 3:
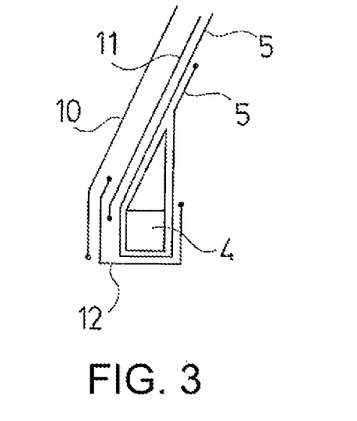
FIG. 3 is a schematic view illustrating a structure of a bead portion according to another embodiment of the present technology.
Figure 4:
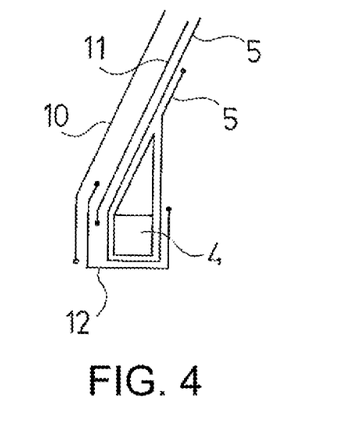
FIG. 4 is a schematic view illustrating a structure of a bead portion according to yet another embodiment of the present technology.

For example, as illustrated in FIGS. 2 to 4, the tire inner side edge of the coating rubber layer 12 can be disposed in a manner such that the edge is sandwiched between the inner liner layer 10 and the tie rubber layer 11. When the edge is disposed in this manner, positions of the terminating edges of the inner liner layer 10 and the tie rubber layer 12 can be set at any positions. The terminating edge of the tie rubber layer 11 may be extended inward in the tire radial direction more than the terminating edge of the inner liner layer 10 as illustrated in FIG. 2, the terminating edges of the tie rubber layer 11 and the inner liner layer 10 may terminate at the same position in the tire radial direction as illustrated in FIG. 3, or the terminating edge of the inner liner layer 10 may be extended inward in the tire radial direction more than the terminating edge of the tie rubber layer 11 as illustrated in FIG. 4. More preferably, the edge of the tie rubber layer 11 is positioned within a range of ±5 to 10 mm in the tire radial direction from the edge of inner liner layer 10.

Figure 5:
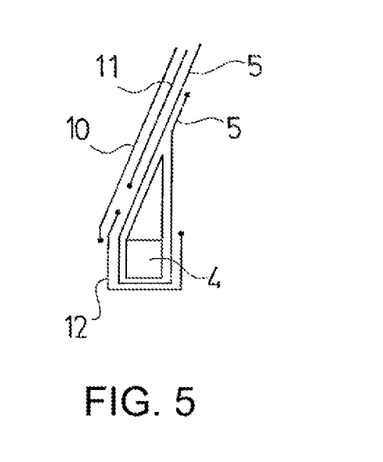
FIG. 5 is a schematic view illustrating a structure of a bead portion according to yet another embodiment of the present technology.

Note that, as illustrated in FIG. 5, it is acceptable for the tie rubber layer 11 to be terminated more to an outer side in the tire radial direction than the coating rubber layer 12, and tie rubber layer 11 and coating rubber layer 12 may be made not to come in contact with each other.

Figure 6:
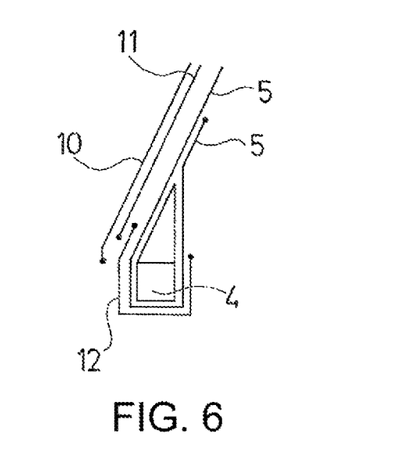
FIG. 6 is a schematic view illustrating a structure of a bead portion according to yet another embodiment of the present technology.

In addition, as illustrated in FIG. 6, the coating rubber layer 12 can be disposed between the tie rubber layer 11 and the carcass layer 5 so as to dispose, in order from tire inner side, the inner liner layer 10, the tie rubber layer 11, and the coating rubber layer 12. At this time, the inner liner layer 10 is extended more toward the inner side in the radial direction than the tie rubber layer 11 to form a region where the inner liner layer 10 and the coating rubber layer 12 overlap. Even when this configuration is employed, since there is the region where the inner liner layer 10 and the coating rubber layer 12 are in contact each other, and thus the inner liner layer 10 and the coating rubber layer 12 are adhered in the region, the adhesion at the interface between the coating rubber layer 12 and the inner liner layer 10 is enhanced, and the separation of the inner liner layer formed from a thermoplastic resin or a thermoplastic elastomer composition can be effectively prevented.

When the tire inner side edge of the coating rubber layer 12 is disposed in a manner such that the edge is sandwiched between the inner liner layer 10 and the tie rubber layer 11 in this manner, the rubber composition constituting the tie rubber layer 11 is preferably a rubber composition having an excellent adhesion to the inner liner layer 10, described hereinafter. By disposing the coating rubber layer 12 sandwiched in between the inner liner layer 10 and the tie rubber layer 11, and by imparting the rubber composition constituting the tie rubber layer 11 with an excellent adhesion to the inner liner layer 10 in this manner, the adhesions between the inner liner layer 10 and the tie rubber layer 11 and between the inner liner layer 10 and the coating rubber layer 12 are further secured. Therefore, the integration between the layers is further enhanced, and the separations between the layers can be prevented.

When each of the layers is disposed as illustrated in FIGS. 2 to 6, and the tie rubber layer 11 is formed from a rubber composition having an excellent adhesion to the inner liner layer 10, there is no need to provide an adhesive layer on the surface of the inner liner layer 10 formed from a thermoplastic resin or a thermoplastic elastomer composition. Therefore, the adhesive does not attach to scrap materials that are generated during the manufacture of the inner liner layer 10, there is no need for removing adhesives when recycling the scrap materials by melting, and thus the recyclability can be improved. In addition, since the process of applying an adhesive is not necessary, the manufacturing process can be simplified.

Figure 7:
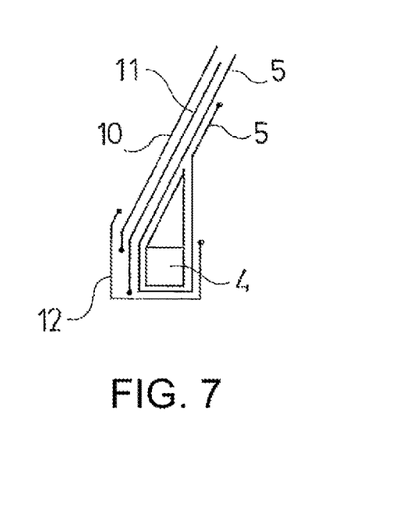
FIG. 7 is a schematic view illustrating a structure of a bead portion according to yet another embodiment of the present technology.
Figure 8:
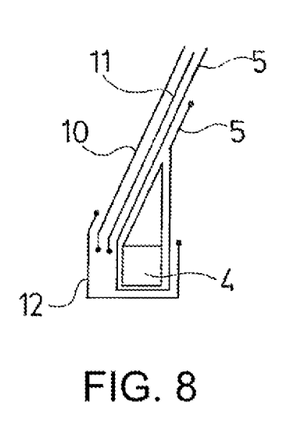
FIG. 8 is a schematic view illustrating a structure of a bead portion according to yet another embodiment of the present technology.
Figure 9:
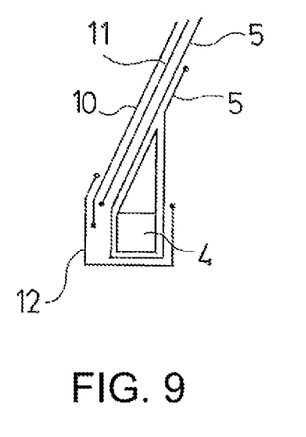
FIG. 9 is a schematic view illustrating a structure of a bead portion according to yet another embodiment of the present technology.

Furthermore, as illustrated in FIGS. 7 to 9, the coating rubber layer 12 can be disposed in a manner such that the coating rubber layer 12 covers an inner side edge in the radial direction of the inner liner layer 10. More specifically, the tire inner side edge of the coating rubber layer 12 can be disposed in the innermost surface of the tire, and the inner liner layer 10 and the tie rubber layer 11 can be disposed in a manner such that the inner liner layer 10 and the tie rubber layer 11 are sandwiched between the coating rubber layer 12 and the carcass layer 4. When this configuration is employed, just as in the case described above, the adhesion at the interface between the coating rubber layer 12 and the inner liner layer 10 can be enhanced, and the separation of the inner liner layer formed from a thermoplastic resin or a thermoplastic elastomer composition can be effectively prevented. Furthermore, in the case of this configuration, the edges of the inner liner layer 10 and the tie rubber layer 11 are not exposed on an inner surface of the tire, and thus the separation from these edge portions can be more effectively prevented.

In this case, positions of the terminating edges of the inner liner layer 10 and the tie rubber layer 11 can be set at any positions as long as the edges of the inner liner layer 10 and the tie rubber layer 11 are covered by the coating rubber layer 12. The terminating edge of the tie rubber layer 11 may be extended inward in the tire radial direction more than the terminating edge of the inner liner layer 10 as illustrated in FIG. 7, the terminating edges of the tie rubber layer 11 and the inner liner layer 10 may terminate at the same position in the tire radial direction as illustrated in FIG. 8, or the terminating edge of the inner liner layer 10 may be extended inward in the tire radial direction more than the terminating edge of the tie rubber layer 11 as illustrated in FIG. 9.

When such a configuration is employed, an amount of overlap between the inner liner layer 10 and the coating rubber layer 12 is preferably greater than or equal to 5 mm and less than or equal to 10 mm. Because of this, the separation between the layers can be effectively prevented while reducing the amount of the coating rubber layer. When the amount of overlap is less than 5 mm, the inner liner layer 10 and the coating rubber layer 12 cannot be sufficiently adhered. Also, even when the amount of overlap is increased to greater than 10 mm, since no further effect is expected, it merely increases the mass of the tire.

At this time, the rubber composition constituting the tie rubber layer 11 is preferably a rubber composition having an excellent adhesion to the inner liner layer 10, described hereinafter. Because of this, the adhesion between the inner liner layer 10 and the tie rubber layer 11 and the adhesion at the interface between the inner liner layer 10 and the coating rubber layer 12 are further secured. Therefore, the integration between the layers is further enhanced, and the separations between the layers can be more effectively prevented. In addition, there is no need for providing an adhesive layer on the surface of the inner liner layer 10. Therefore, the adhesive does not attach to scrap materials that are generated during the manufacture of the inner liner layer 10, there is no need for removing adhesives when recycling the scrap materials by melting, and thus the recyclability can be improved. In addition, since the process of applying an adhesive is not necessary, the manufacturing process can be simplified.

As described above, in the present technology, a rubber composition of the coating rubber layer 12, in at least a region where the coating rubber layer 12 and the inner liner layer 10 overlap, is constituted by a specific rubber composition having an adhesion to the inner liner layer 10, and the rubber composition comprises: a rubber component, a condensation product of a compound represented by Formula (1) below and formaldehyde, a methylene donor, and a vulcanizing agent.

Formula 4

(1)

In the formula, $R^1$, $R^2$, $R^3$, $R^4$, and $R^5$ are hydrogen, a hydroxyl group, or an alkyl group having from 1 to 8 carbons.

Examples of the rubber component include diene rubber and hydrogenated products thereof, olefin rubber, halogen-containing rubber, silicone rubber, sulfur-containing rubber, fluororubber, and the like. Examples of the diene rubber and hydrogenated products thereof include natural rubber (NR), isoprene rubber (IR), epoxidized natural rubber, styrene butadiene rubber (SBR), butadiene rubber (BR) (high-cis BR and low-cis BR), acrylonitrile butadiene rubber (NBR), hydrogenated NBR, hydrogenated SBR, and the like. Examples of the olefin rubber include ethylene propylene rubber (EPM), ethylene propylene diene rubber (EPDM), maleic acid-modified ethylene propylene rubber (M-EPM), a maleic anhydride-modified ethylene-α-olefin copolymer, an ethylene-glycidyl methacrylate copolymer, a maleic anhydride-modified ethylene-ethyl acrylate copolymer (modified EEA), butyl rubber (IIR), a copolymer of isobutylene and an aromatic vinyl or diene monomer, acrylic rubber (ACM), an ionomer, and the like. Examples of the halogen-containing rubber include halogenated butyl rubber, such as brominated butyl rubber (Br-IIR) or chlorinated butyl rubber (Cl-IIR), a brominated isobutylene-p-methylstyrene copolymer (BIMS), halogenated isobutylene-isoprene copolymer rubber, chloroprene rubber (CR), hydrin rubber (CHR), chlorosulfonated polyethylene (CSM), chlorinated polyethylene (CM), maleic acid-modified chlorinated polyethylene (M-CM), and the like. Examples of the silicone rubber include methyl vinyl silicone rubber, dimethyl silicone rubber, methyl phenyl vinyl silicone rubber, and the like. Examples of the sulfur-containing rubber include polysulfide rubber and the like. Examples of the fluororubber include vinylidene fluoride rubber, fluorine-containing vinyl ether rubber, tetrafluoroethylene-propylene rubber, fluorine-containing silicone rubber, fluorine-containing phosphazene rubber, and the like. Of these, from the perspective of co-crosslinking with an adjacent rubber material, diene rubber, olefin rubber, and halogen-containing rubber are preferable, and more preferable are natural rubber, styrene butadiene rubber, butadiene rubber, brominated butyl rubber, and ethylene-propylene-diene rubber. The rubber component may be a mixture of two or more rubber components.

In a preferable example of a compound represented by Formula (1), at least one of $R^1$, $R^2$, $R^3$, $R^4$, and $R^5$ is an alkyl group having from 1 to 8 carbons, and the others are hydrogens or alkyl groups having from 1 to 8 carbons. A specific preferable example of a compound represented by Formula (1) is cresol.

In another preferable example of a compound represented by Formula (1), at least one of $R^1$, $R^2$, $R^3$, $R^4$, and $R^5$ is a hydroxyl group, and the others are hydrogens or alkyl groups having from 1 to 8 carbons. Another specific preferable example of a compound represented by Formula (1) is resorcin.

Examples of a condensate of a compound represented by Formula (1) and formaldehyde include a cresol/formaldehyde condensate, a resorcin/formaldehyde condensate, and the like. These condensates may be modified to the extent that the effects of the present technology are not disturbed. For example, a modified resorcin/formaldehyde condensate modified by an epoxy compound can be utilized in the present technology. Such condensates are commercially available, and the commercial products can be utilized in the present technology.

A condensate of a compound represented by Formula (1) and formaldehyde is preferably a compound represented by Formula (2) or Formula (3):

Formula 5

(2)

in the formula, n is an integer, and preferably an integer from 1 to 5;

Formula 6

(3)

in the formula, m is an integer, and preferably an integer from 1 to 3.

A "methylene donor" refers to a basic compound, which generates formaldehyde by heating, etc., and examples thereof include hexamethylenetetramine, pentamethylenetetramine, hexamethylenediamine, methylolmelamine, etherified methylolmelamine, modified etherified methylolmelamine, esterified methylolmelamine, hexamethoxymethylolmelamine, hexamethylolmelamine, hexakis(ethoxymethyl)melamine, hexakis(methoxymethyl)melamine, N,N',N''-trimethyl-N,N',N''-trimethylolmelamine, N,N',N''-trimethylolmelamine, N-methylolmelamine, N,N'-bis(methoxymethyl)melamine, N,N',N''-tributyl-N,N',N''-trimethylolmelamine, paraformaldehyde, and the like. Of these, from the perspective of the formaldehyde release temperature, a modified etherified methylolmelamine is preferable.

As a vulcanizing agent, there are an inorganic vulcanizing agent and an organic vulcanizing agent; and examples of an inorganic vulcanizing agent include sulfur, sulfur monochloride, selenium, tellurium, zinc oxide, magnesium oxide, lead monoxide, and the like; and examples of an organic vulcanizing agent include a sulfur-containing organic compound, dithiocarbamic acid salt, oximes, tetrachloro-p-benzoquinone, a dinitroso compound, a modified phenol resin, polyamine, organic peroxide, and the like. Of these, sulfur, organic peroxide such as 1,3-bis-(t-butylperoxyisopropyl)-benzene, a modified phenol resin such as a brominated alkylphenol/formaldehyde condensate, zinc oxide, and a sulfur-containing organic compound are preferable.

The compounded amount of a condensate of a compound represented by Formula (1) and formaldehyde (hereinafter, also referred to simply as "condensate") is from 0.5 to 20 parts by mass, and preferably from 1 to 10 parts by mass, relative to 100 parts by mass of the rubber component. If the compounded amount of the condensate is too low, the amount of heat and time required for heating in order to obtain adequate adhesion increases and the vulcanization efficiency decreases. On the other hand, if the compounded amount of the condensate is too high, the elongation of a vulcanized product of the obtained rubber composition is impaired leading to being easily broken.

The compounded amount of a methylene donor is from 0.25 to 200 parts by mass, preferably from 0.5 to 80 parts by mass, and more preferably from 1 to 40 parts by mass, relative to 100 parts by mass of the rubber component. If the compounded amount of the methylene donor is too low, the donor is used up by a resin reaction in the rubber composition system and a reaction in an interface reaction does not proceed well, and the adhesion becomes poor. On the other hand, if the compounded amount of the methylene donor is too large, the reaction in the rubber composition system may be accelerated too much, or a crosslinking reaction in a resin system of an adherend may be triggered, thereby impairing the adhesion.

The proportion of the compounded amount of the methylene donor to the compounded amount of the condensate is from 0.5 to 10, preferably from 1 to 4, and further preferably from 1 to 3. If the proportion is too small, the donor is used up by a resin reaction in the rubber composition system, and a reaction in an interface reaction does not proceed well, and the adhesion becomes poor. On the other hand, if this proportion is too large, the reaction in the rubber composition system may be accelerated too much, or a crosslinking reaction in a resin system of an adherend may be triggered, thereby impairing the adhesion.

If the rubber component contains a diene rubber and the vulcanizing agent is sulfur, it is preferable that the rubber composition does not contain a vulcanization accelerator.

Examples of diene rubber include natural rubber (NR), isoprene rubber (IR), styrene butadiene rubber (SBR), butadiene rubber (BR), acrylonitrile/butadiene rubber (NBR), and the like. Of these, from the perspective of co-crosslinking with an adjacent rubber material, natural rubber, styrene/butadiene rubber, butadiene rubber, isoprene rubber, and mixtures thereof are preferable.

The proportion of diene rubber in the rubber component is preferably 50 mass % or higher, more preferably 70 mass % or higher, and further preferably, all the rubber component is diene rubber.

If the rubber component contains a diene rubber, the vulcanizing agent is sulfur, and the rubber component further contains a vulcanization accelerator, it is preferable that the compounded amount of the condensate is more than 3 parts by mass, but not more than 20 parts by mass relative to 100 parts by mass of the rubber component, and the compounded amount of the methylene donor is preferably more than 1.5 parts by mass, but not more than 200 parts by mass, more preferably more than 3 parts by mass, but not more than 80 parts by mass, relative to 100 parts by mass of the rubber component. If the compounded amount of the condensate is too low, the condensate reacts with a vulcanization accelerator hindering the progress of a reaction with a resin at the interface. On the other hand, if the compounded amount of the condensate is too high, the elongation of a vulcanized product of the obtained rubber composition is impaired leading to being easily broken. If the compounded amount of the methylene donor is too low, the donor is used up by a resin reaction in the rubber composition system and a reaction in an interface reaction does not proceed well, and the adhesion becomes poor. On the other hand, if the compounded amount of the methylene donor is too large, the reaction in the rubber composition system may be accelerated too much, or a crosslinking reaction in a resin system of an adherend may be triggered, thereby impairing the adhesion.

Examples of the vulcanization accelerator include an aldehyde/ammonia type, an aldehyde/amine type, a thiourea type, a guanidine type, a thiazole type, a sulfenamide type, a thiuram type, a dithiocarbamic acid salt type, and a xanthogenic acid salt type, and preferable examples include a thiazole type, a sulfenamide type, and a thiuram type.

A thiazole type vulcanization accelerator is a compound having a thiazole structure, and examples thereof include di-2-benzothiazolyldisulfide, mercaptobenzothiazole, benzothiazyldisulfide, mercaptobenzothiazole zinc salt, (dinitrophenyl)mercaptobenzothiazole, (N,N-diethylthiocarbamoylthio)benzothiazole, and the like; and of these, di-2-benzothiazolyldisulfide is preferable.

A sulfenamide type vulcanization accelerator is a compound having a sulfenamide structure, and examples thereof include N-cyclohexylbenzothiazole sulfenamide, N-t-butylbenzothiazole sulfenamide, N-oxydiethylenebenzothiazole sulfenamide, N,N-dicyclohexylbenzothiazole sulfenamide, (morpholinodithio)benzothiazole, and the like; and of these, N-t-butyl-2-benzothiazole sulfenamide is preferable.

A thiuram type vulcanization accelerator is a compound having a thiuram structure, and examples thereof include tetrakis(2-ethylhexyl)thiuram disulfide, tetramethylthiuram disulfide, tetramethylthiuram monosulfide, tetraethylthiuram disulfide, tetrabutylthiuram disulfide, dipentamethylenethiuram hexasulfide, and the like; and of these, tetrakis(2-ethylhexyl)thiuram disulfide is preferable.

If the rubber component contains diene rubber, the vulcanizing agent is sulfur, the rubber component further contains a vulcanization accelerator, the compounded amount of the condensate is from 0.5 to 3 parts by mass relative to 100 parts by mass of the rubber component, and the compounded amount of the methylene donor is from 0.25 to 30 parts by mass relative to 100 parts by mass of the rubber component, it is preferable that the compounded amount of the sulfur be less than 4 parts by mass relative to 100 parts by mass of the rubber component, and the compounded amount of the vulcanization accelerator be more than 0 parts by mass but less than 2.1 parts by mass relative to 100 parts by mass of the rubber component. If the compounded amount of the sulfur is too high, a competing reaction with the condensate proceeds in a rubber composition system, and the adhesion is reduced. If a vulcanization accelerator is not contained, it becomes difficult for the vulcanization reaction to proceed, and the vulcanization efficiency decreases. On the other hand, if the compounded amount of the vulcanization accelerator is too high, a condensate reacts with a vulcanization accelerator and a reaction with a resin at the interface will not easily proceed.

In this case, if the vulcanization accelerator is a compound having a sulfenamide structure, the compounded amount of a compound having a sulfenamide structure is preferably more than 0 parts by mass but less than 1.5 parts by mass. If the above amount of the compound having a sulfenamide structure is not contained, it becomes difficult for the vulcanization reaction to proceed, and the vulcanization efficiency is impaired. On the other hand, if the compounded amount of the compound having a sulfenamide structure is too high, a reaction of the accelerator competes against a reaction of a resin, thereby disturbing an adhesion reaction.

In this case, if a rubber composition contains, as vulcanization accelerators, a compound having a sulfenamide structure and a compound having a thiuram structure, the compounded amount of a compound having a thiuram structure is preferably more than 0 parts by mass but less than 0.6 parts by mass. If the above amount of the compound having a thiuram structure is not contained, the adhesion effect becomes sensitive to the compounded amount of the sulfur. On the other hand, if the compounded amount of a compound having a thiuram structure is too high, an adhesion reaction is disturbed by released sulfur.

A combination of a film containing an ethylene-vinyl alcohol copolymer and a rubber composition containing a condensate of a compound represented by the Formula (1) (in the formula, at least one of $R^1$, $R^2$, $R^3$, $R^4$, and $R^5$ is a hydroxyl group, and the others are hydrogens or alkyl groups having from 1 to 8 carbons) and formaldehyde is particularly preferable because the adhesive property at the interface between the film and a layer of the rubber composition is excellent.

Here, a film containing an ethylene-vinyl alcohol copolymer means a thermoplastic resin film, in which the thermoplastic resin contains an ethylene-vinyl alcohol copolymer, or a thermoplastic elastomer composition film, in which a thermoplastic resin component constituting the thermoplastic elastomer composition contains an ethylene-vinyl alcohol copolymer. In the case of a thermoplastic resin film, the compounded amount of an ethylene-vinyl alcohol copolymer is preferably from 5 to 100 mass %, and more preferably from 20 to 70 mass %, relative to the total amount of the thermoplastic resin. In the case of a thermoplastic elastomer composition film, the compounded amount of an ethylene-vinyl alcohol copolymer is preferably from 5 to 100 mass %, and more preferably 20 to 70 mass %, of the total amount of the thermoplastic resin component.

An ethylene-vinyl alcohol copolymer (hereinafter, also referred to as "EVOH") is a copolymer composed of an ethylene unit ($—CH_2CH_2—$) and a vinyl alcohol unit ($—CH_2—CH(OH)—$), but it may contain, in addition to the ethylene unit and the vinyl alcohol unit, another structural unit to the extent that the effects of the present technology are not disturbed. An ethylene-vinyl alcohol copolymer with an ethylene unit content, or in other words an ethylene content, of preferably from 5 to 55 mol %, and more preferably from 20 to 50 mol %, is used. If the ethylene content of the ethylene-vinyl alcohol copolymer is too low, the compatibility with a polyamide resin becomes poor. On the other hand, if the ethylene content is too high, the number of hydroxyl groups contained in a thermoplastic resin decreases, and thus improvement in adhesive strength cannot be expected. An ethylene-vinyl alcohol copolymer is a saponified product of an ethylene-vinyl acetate copolymer, and the degree of saponification thereof is preferably 90% or higher, and more preferably 99% or higher. If the degree of saponification of an ethylene-vinyl alcohol copolymer is too low, the air barrier property deteriorates, and also the thermal stability deteriorates. An ethylene-vinyl alcohol copolymer is commercially available, and for example, is available under the trade name of Soarnol (registered trademark) from Nippon Synthetic Chemical Industry Co., Ltd., and under the trade name of Eval (registered trademark) from Kuraray Co., Ltd. Examples of the ethylene-vinyl alcohol copolymer with the ethylene content of 5 to 55 mol % include Soarnol (registered trademark) H4815B (ethylene content: 48 mol %), A4412B (ethylene content: 42 mol %), DC3212B (ethylene content: 32 mol %), and V2504RB (ethylene content: 25 mol %) manufactured by Nippon Synthetic Chemical Industry Co., Ltd., and Eval (registered trademark) L171B (ethylene content: 27 mol %), H171B (ethylene content: 38 mol %), E171B (ethylene content: 44 mol %) manufactured by Kuraray Co., Ltd., and the like.

In the present technology, the rubber composition described above is preferably used in at least the region of overlap between the coating rubber layer 12 and the inner liner layer 10; however, the entire coating rubber layer 12 may be constituted from the rubber composition. In addition, as described above, the rubber composition described above can also be used in the tie rubber layer 11.

Although the coating rubber layer 12 in the region where the coating rubber layer 12 and the inner liner layer 10 overlap may be configured to be a laminate formed by using the rubber composition described above, to reduced the used amount of the rubber and to simplify the manufacturing process, the coating rubber layer 12 in the region is preferably configured to be a single layer.

Examples of the thermoplastic resin constituting the inner liner layer 10 of the present technology include a polyamide resin, a polyester resin, a polynitrile resin, a polymethacrylate resin, a polyvinyl resin, a cellulose resin, a fluororesin, an imide resin, a polystyrene resin, a polyolefin resin, and the like. Examples of the polyamide resin include nylon 6 (N6), nylon 66 (N66), nylon 46 (N46), nylon 11 (N11), nylon 12 (N12), nylon 610 (N610), nylon 612 (N612), nylon 6/66 (N6/66), nylon 6/66/12 (N6/66/12), nylon 6/66/610 (N6/66/610), nylon MXD6 (MXD6), nylon 6T, nylon 6/6T, nylon 9T, a nylon 66/PP copolymer, a nylon 66/PPS copolymer, and the like. Examples of the polyester resin include aromatic polyesters, such as poly(butylene terephthalate) (PBT), poly(ethylene terephthalate) (PET), poly(ethylene isophthalate) (PEI), a PET/PEI copolymer, polyarylate (PAR), poly(butylene naphthalate) (PBN), a liquid crystal polyester, a polyoxyalkylene diimidic acid/polybutyrate-terephthalate copolymer, and the like. Examples of the polynitrile resin include polyacrylonitrile (PAN), polymethacrylonitrile, an acrylonitrile/styrene copolymer (AS), a methacrylonitrile/styrene copolymer, a methacrylonitrile/styrene/butadiene copolymer, and the like. Examples of the polymethacrylate resin include poly(methyl methacrylate) (PMMA), poly(ethyl methacrylate), and the like. Examples of the polyvinyl resin include poly(vinyl acetate) (PVAc), poly(vinyl alcohol) (PVA), an ethylene-vinyl alcohol copolymer (EVOH), poly(vinylidene chloride) (PVDC), poly(vinyl chloride) (PVC), a vinyl chloride/vinylidene chloride copolymer, a vinylidene chloride/methyl acrylate copolymer, and the like. Examples of the cellulose resin include cellulose acetate, cellulose acetate butyrate, and the like. Examples of the fluororesin include poly(vinylidene fluoride) (PVDF), poly(vinyl fluoride) (PVF), polychlorofluoroethylene (PCTFE), a tetrafluoroethylene/ethylene copolymer (ETFE), and the like. Examples of the imide resin include an aromatic polyimide (PI) and the like. Examples of the polystyrene resin include polystyrene (PS) and the like. Examples of the polyolefin resin include polyethylene (PE), polypropylene (PP), and the like. Of these, poly(vinyl alcohol), an ethylene-vinyl alcohol copolymer, nylon 6, nylon 66, nylon 11, nylon 12, nylon 610, nylon 612, nylon 6/66, nylon MXD6, and nylon 6T are preferable from the perspective of satisfying both fatigue resistance and air barrier properties.

In order to improve processability, dispersibility, heat resistance, oxidation resistance, or the like, the thermoplastic resin may contain an additive ingredient that is generally blended into a resin composition, such as a filler, a reinforcing agent, a processing aid, a stabilizer, and an antioxidant, to the extent that it does not disturb effects of the present technology. Although a plasticizer should not be added from the perspectives of air barrier properties and heat resistance, a plasticizer may be added to the extent that it does not disturb effects of the present technology.

A thermoplastic elastomer composition constituting the film is a composition in which an elastomer component is dispersed in a thermoplastic resin component, the thermoplastic resin component constitutes a matrix phase, and the elastomer component constitutes a dispersion phase.

As a thermoplastic resin component constituting the thermoplastic elastomer composition, the same thermoplastic resins described above can be used.

Examples of the elastomer component constituting the thermoplastic elastomer composition include diene rubber and hydrogenated products thereof, olefin rubber, halogen-containing rubber, silicone rubber, sulfur-containing rubber, fluororubber, and the like. Examples of the diene rubber and hydrogenated products thereof include natural rubber (NR), isoprene rubber (IR), epoxidized natural rubber, styrene butadiene rubber (SBR), butadiene rubber (BR) (high-cis BR and low-cis BR), acrylonitrile butadiene rubber (NBR), hydrogenated NBR, hydrogenated SBR, and the like. Examples of the olefin rubber include ethylene propylene rubber (EPM), ethylene propylene diene rubber (EPDM), maleic acid-modified ethylene propylene rubber (M-EPM), a maleic anhydride-modified ethylene-α-olefin copolymer, an ethylene-glycidyl methacrylate copolymer, a maleic anhydride-modified ethylene-ethylacrylate copolymer (modified EEA), butyl rubber (IIR), a copolymer of isobutylene and an aromatic vinyl or diene monomer, acrylic rubber (ACM), an ionomer, and the like. Examples of the halogen-containing rubber include halogenated butyl rubber, such as brominated butyl rubber (Br-IIR) or chlorinated butyl rubber (Cl-IIR), a brominated isobutylene-p-methylstyrene copolymer (BIMS), halogenated isobutylene-isoprene copolymer rubber, chloroprene rubber (CR), hydrin rubber (CHR), chlorosulfonated polyethylene (CSM), chlorinated polyethylene (CM), maleic acid-modified chlorinated polyethylene (M-CM), and the like. Examples of the silicone rubber include methyl vinyl silicone rubber, dimethyl silicone rubber, methyl phenyl vinyl silicone rubber, and the like. Examples of the sulfur-containing rubber include polysulfide rubber and the like. Examples of the fluororubber include vinylidene fluoride rubber, fluorine-containing vinyl ether rubber, tetrafluoroethylene-propylene rubber, fluorine-containing silicone rubber, fluorine-containing phosphazene rubber, and the like. Of these, a brominated isobutylene-p-methylstyrene copolymer, a maleic anhydride-modified ethylene-α-olefin copolymer, an ethylene-glycidyl methacrylate copolymer, and a maleic anhydride-modified ethylene-ethyl acrylate copolymer are preferable from the perspective of air barrier properties.

The elastomer component may contain an additive ingredient that is generally blended into a rubber composition, such as a miscellaneous reinforcing agent (filler) (e.g. carbon black or silica), a softening agent, an antiaging agent, or a processing aid, to the extent that it does not disturb effects of the present technology.

Although there is no particular restriction on a combination of an elastomer component and a thermoplastic resin component constituting the thermoplastic elastomer composition, examples of the combination include halogenated butyl rubber and a polyamide resin, brominated isobutylene-p-methylstyrene copolymer rubber and a polyamide resin, butadiene rubber and a polystyrene resin, isoprene rubber and a polystyrene resin, hydrogenated butadiene rubber and a polystyrene resin, ethylene propylene rubber and a polyolefin resin, ethylene propylene diene rubber and a polyolefin resin, amorphous butadiene rubber and syndiotactic poly(1,2-polybutadiene), amorphous isoprene rubber and trans-poly(1,4-isoprene), and fluororubber and a fluororesin; while a combination of butyl rubber and a polyamide resin having an excellent air barrier property is preferable. Of these, a combination of brominated isobutylene-p-methylstyrene copolymer rubber (which is a type of modified butyl rubber), and nylon 6/66 or nylon 6, or a blended resin of nylon 6/66 and nylon 6 is particularly preferable from the perspective of satisfying both fatigue resistance and air barrier properties.

A thermoplastic elastomer composition can be produced by dispersing an elastomer component as a dispersion phase into a thermoplastic resin component constituting a matrix phase by melting and kneading the thermoplastic resin component and the elastomer component using, for example, a twin-screw kneader extruder. The mass ratio of a thermoplastic resin component to an elastomer component is, without being limited thereto, preferably from 10/90 to 90/10, and more preferably from 15/85 to 90/10.

The thermoplastic resin or the thermoplastic elastomer composition may contain various additives to the extent that the effects of the present technology are not disturbed.

EXAMPLES

Four types of rubber compositions, conventional rubber A1 (for tie rubber), conventional rubber A2 (for coating rubber), present technology rubber B1 (for tie rubber), and present technology rubber B2 (for coating rubber), were prepared by compounding the ingredients described below at compounding ratios shown in Table 1.

Styrene butadiene rubber: "Nipol 1502" manufactured by Zeon Corporation
Butadiene rubber: "Nipol 1220" manufactured by Zeon Corporation
Natural rubber: SIR-20
Carbon black: "Seast V" manufactured by Tokai Carbon Co., Ltd.
Stearic acid: stearic acid for industrial use
Aroma oil: "Desolex No. 3" manufactured by Showa Shell Sekiyu K.K.
Modified resorcin/formaldehyde condensate: "Sumikanol 620" manufactured by Taoka Chemical Co., Ltd.
Methylene donor: modified etherified methylolmelamine ("Sumikanol 507AP" manufactured by Taoka Chemical Co., Ltd.)
Sulfur: 5% oil extended sulfur
Sulfenamide: N-t-butyl-2-benzothiazolesulfenamide ("NOCCELER NS" manufactured by Ouchi Shinko Chemical Industrial Co., Ltd.)

TABLE 1

| | | Conventional rubber | | Present technology rubber | |
|---|---|---|---|---|---|
| | | A1 (for tie rubber) | A2 (for coating rubber) | B1 (for tie rubber) | B2 (for coating rubber) |
| Styrene butadiene rubber | Parts by mass | 50 | 50 | 50 | 50 |
| Butadiene rubber | Parts by mass | | 50 | | 50 |
| Natural rubber | Parts by mass | 50 | | 50 | |
| Carbon black | Parts by mass | 60 | 70 | 60 | 70 |
| Stearic acid | Parts by mass | 1 | 1 | 1 | 1 |
| Aroma oil | Parts by mass | 8 | 9 | 8 | 9 |

TABLE 1-continued

|  |  | Conventional rubber | | Present technology rubber | |
| --- | --- | --- | --- | --- | --- |
|  |  | A1 (for tie rubber) | A2 (for coating rubber) | B1 (for tie rubber) | B2 (for coating rubber) |
| Modified resorcin/ formaldehyde condensate | Parts by mass | 0 | 0 | 2 | 2 |
| Methylene donor | Parts by mass | 0 | 0 | 3 | 3 |
| Sulfur | Parts by mass | 3 | 3 | 3 | 3 |
| Sulfenamide | Parts by mass | 1 | 1 | 1 | 1 |

Five types of test tires were produced, for Conventional Example 1, Working Examples 1 and 2, and Comparative Examples 1 and 2, by setting each of the following configurations as shown in Table 3: arrangement of an inner liner layer, a tie rubber layer, and a coating rubber layer in a bead portion; the thickness of the inner liner layer; presence or absence of the coating rubber layer; materials of the tie rubber layer and the coating rubber layer (conventional rubber A1 (for tie rubber), conventional rubber A2 (for coating rubber), present technology rubber B1 (for tie rubber), and present technology rubber B2 (for coating rubber)). The tire size of 195/65R15 was used for all test tires, and the overall structure of the tires was the same as the structure illustrated in FIG. 1. Note that, in each example, the amount of overlap between the inner liner layer and the coating rubber layer was set to be 10 mm.

Note that, the inner liner layer was formed from a thermoplastic resin elastomer composition prepared by compounding ingredients at a compounding ratio as described in Table 2 below.

TABLE 2

|  |  | Parts by mass |
| --- | --- | --- |
| BIMS[a] | "Exxpro 3035" manufactured by Exxon Mobile Chemical | 100 |
| Zinc oxide | "Zinc Oxide #3" manufactured by Seido Chemical Industry Co., Ltd. | 0.5 |
| Stearic acid | Industrial stearic acid | 0.2 |
| Zinc stearate | "Zinc stearate" manufactured by NOF Corporation | 1 |
| N6/66 | "UBE Nylon 5033B" manufactured by Ube Industries, Ltd. | 100 |
| Modified EEA[b] | "HPR-AR 201" manufactured by DuPont-Mitsui Polychemicals Co., Ltd.) | 10 |

Remarks: [a] A brominated isobutylene-p-methylstyrene copolymer
[b] A maleic anhydride-modified ethylene-ethyl acrylate copolymer For these five types of test tires, scrap material recyclability, vulcanization defects, inner liner edge defects during rim assembling, adhesion durability were evaluated according to evaluation methods described below. The results are shown in Table 3.

Furthermore, five types of test tires were produced, for Conventional Example 2, Working Examples 3 and 4, and Comparative Examples 3 and 4, by setting each of the following configurations as shown in Table 4: arrangement of an inner liner layer, a tie rubber layer, and a coating rubber layer in a bead portion; the thickness of the inner liner layer; presence or absence of the coating rubber layer; materials of the tie rubber layer and the coating rubber layer (conventional rubber A1 (for tie rubber), conventional rubber A2 (for coating rubber), present technology rubber B1 (for tie rubber), and present technology rubber B2 (for coating rubber)). The tire size of 195/65R15 was used for the all the test tires, and the overall structure of the tires was the same as the structure illustrated in FIG. 1. Note that, in each example, the amount of overlap between the inner liner layer and the coating rubber layer was set to be 10 mm.

For these five types of test tires, moldability, inner liner edge defects during rim assembling, adhesion durability of the inner liner edge were evaluated according to evaluation methods described below. The results are shown in Table 4.

Scrap Material Recyclability

When no adhesive was attached on a scrap material and the scrap material was recyclable as is, the scrap material was evaluated as "○". When some adhesives were attached on a scrap material and the scrap material could not be recycled as is, the scrap material was evaluated as "x".

Vulcanization Defects

After vulcanizing 50 test tires, an inner side of a bead portion was visually observed. The evaluation results were indicated as follows: when there were no defects, the tire was evaluated as "○"; when there were minor defects that would not be problematic in practical use, the tire was evaluated as "Δ"; and when there were defects that would be problematic in practical use, the tire was evaluated as "x".

Inner Liner Edge Defects During Rim Assembling

Using a rim assembling device, a tire was repeatedly assembled and disassembled from a rim for 10 times each, then the inner liner edge was visually observed to determine if there were cracks or peeling. The evaluation results were indicated as follows: when there were no cracks or peeling, the tire was evaluated as "○"; when there were minor cracks or peeling that would not be a problem in practical use, the tire was evaluated as "Δ"; and when cracks or peeling occurred after three or fewer repetitions of assembling/disassembling from the rim, and the tire would be problematic in practical use, the tire was evaluated as "x".

Adhesion Durability

A test tire was assembled on a rim having a rim size of 15×6JJ, and inflated to an inner pressure of 140 kPa. The adhesion durability was tested at an ambient temperature of 38° C. using a drum testing machine (drum diameter: 1,700 mm) by running for 10,000 km under the following conditions: load=400 kN; and speed=80 km/h. After the running, presence or absence of peeling defects of the inner liner layer was visually observed. A test tire in which peel did not occur was evaluated as "○", and a test tire in which peeling occurred was evaluated as "x".

Moldability

Centering accuracy was evaluated when an inner liner was set on a molding drum during a test tire molding. Deviations relative to a design value were measured after molding 50 of each test tire. After an average value of the deviations were determined for each of the test tires, the evaluation results were indicated as follows: when the average value of the deviations was less than (or, improved relative to) the average value of Comparative Example 2, the test tire was evaluated as "○"; when the average value of the deviations was equal to or greater than (or, worsened relative to) the average value of Comparative Example 2, the test tire was evaluated as "x".

Adhesion Durability of the Inner Liner Edge

A test tire was assembled on a rim having a rim size of 15×6JJ, inflated to an inner pressure of 230 kPa, and left in an oven at 80° C. with no load for two weeks. Then, the test tire was inflated to an inner pressure of 230 kPa again, and a load of 100% of the load capacity stipulated by JATMA (Japan Automobile Tyre Manufacturers Association, Inc.) was applied. Thereafter, the test tire was run at a running speed of 80 km/h by a drum testing machine (drum diameter: 1,700 mm), and the tire inner surface was visually observed at every 1000 km. The test tire was repeatedly run until damage occurred, and the distance at which the damage occurred was measured. Evaluation results were expressed as index values, Conventional Example 2 being assigned an index value of 100. Larger index values indicate superior adhesive durability of the inner liner edge. Note that, when damage occurred before the running was started, the result was indicated as "-".

TABLE 3

|  |  | Conventional Example 1 | Working Example 1 | Working Example 2 | Comparative Example 1 | Comparative Example 2 |
|---|---|---|---|---|---|---|
| Arrangement of each layer |  | FIG. 2 | FIG. 2 | FIG. 6 | FIG. 6 | FIG. 2 |
| Thickness of inner liner layer | μm | 130 | 130 | 130 | 130 | 130 |
| Presence/absence of adhesive layer (Thickness) | μm | Present (10) | Absent | Absent | Absent | Absent |
| Tie rubber layer material |  | A1 | B1 | B1 | A1 | A1 |
| Coating rubber layer material |  | A2 | B2 | B2 | A2 | A2 |
| Scrap material recyclability |  | × | ○ | ○ | ○ | ○ |
| Vulcanization defects |  | Δ | ○ | ○ | × | × |
| Inner liner edge defects during rim assembling |  | ○ | ○ | ○ | × | × |
| Adhesion durability |  | ○ | ○ | ○ | × | × |

TABLE 4

|  |  | Conventional Example 2 | Working Example 3 | Working Example 4 | Comparative Example 3 | Comparative Example 4 |
|---|---|---|---|---|---|---|
| Arrangement of each layer |  | FIG. 2 | FIG. 9 | FIG. 7 | FIG. 7 | FIG. 9 |
| Thickness of inner liner layer | μm | 130 | 130 | 130 | 130 | 130 |
| Presence/absence of adhesive layer (Thickness) | μm | Present (10) | Absent | Absent | Absent | Absent |
| Tie rubber layer material |  | A1 | B1 | B1 | A1 | A1 |
| Coating rubber layer material |  | A2 | B2 | B2 | A2 | A2 |
| Moldability |  | — | ○ | ○ | × | × |
| Inner liner edge defects during rim assembling |  | ○ | ○ | ○ | × | × |
| Adhesion durability of inner liner edge | Index value | 100 | 142 | 150 | — | — |

As indicated in Table 3, in comparison with Comparative Example 1, both Working Examples 1 and 2 showed good results for evaluations of scrap material recyclability, vulcanization defects, inner liner edge defects during rim assembling, and adhesion durability. On the other hand, in Comparative Examples 1 and 2, good results were not achieved in evaluations of vulcanization defects and inner liner edge defects during rim assembling, and adhesion durability.

As indicated in Table 4, in comparison with Conventional Example 2, both Working Examples 3 and 4 showed good results for evaluations of moldability, inner liner edge defects during rim assembling, and adhesion durability of the inner liner edge. On the other hand, in Comparative Examples 3 and 4, good results were not achieved in evaluations of moldability, inner liner edge defects during rim assembling, and adhesion durability of the inner liner edge.

What is claimed is:

1. A pneumatic tire comprising:
an inner liner layer formed from a thermoplastic resin or a thermoplastic elastomer composition, wherein the thermoplastic elastomer composition is obtained by blending a thermoplastic resin with an elastomer, the inner liner layer being disposed on an inner side of a carcass layer;
a tie rubber layer disposed between the inner liner layer and the carcass layer; and
a coating rubber layer disposed on a bead portion to protect a base surface of the bead portion;
the coating rubber layer and the inner liner layer being disposed in a manner such that the coating rubber layer and the inner liner layer overlap each other;
a rubber composition in at least a region of the coating rubber layer where the coating rubber layer and the inner liner layer overlap contains:
a rubber component, a condensation product of a compound represented by Formula (1) below and formaldehyde, a methylene donor, and a vulcanizing agent;

a compounded amount of the condensation product being from 6 to 20 parts by mass relative to 100 parts by mass of the rubber component; and a proportion of a compounded amount of the methylene donor to the compounded amount of the condensation product being from 3.0:1 to 10:1;

Formula 1

(1)

wherein, $R^1$, $R^2$, $R^3$, $R^4$, and $R^5$ are hydrogen, a hydroxyl group, or an alkyl group having from 1 to 8 carbons.

2. The pneumatic tire according to claim 1, wherein the coating rubber layer is disposed between the inner liner layer and the carcass layer, and a rubber composition in at least a region of the tie rubber layer where the tie rubber layer and the inner liner layer overlap contains:

a rubber component, a condensation product of a compound represented by the Formula (1) and formaldehyde, a methylene donor, and a vulcanizing agent;

a compounded amount of the condensation product is from 0.5 to 20 parts by mass relative to 100 parts by mass of the rubber component; and a proportion of a compounded amount of the methylene donor to the compounded amount of the condensation product is from 0.5:1 to 10:1.

3. The pneumatic tire according to claim 2, wherein an inner side edge in a radial direction of the inner liner layer is positioned in a region not higher than 35% of a tire cross sectional height.

4. The pneumatic tire according to claim 1, wherein the coating rubber layer is disposed in a manner such that the coating rubber layer covers an inner side edge in a radial direction of the inner liner layer.

5. The pneumatic tire according to claim 4, wherein a position of the inner side edge in the radial direction of the inner liner layer is set in a region not higher than 35% of a tire cross sectional height.

6. The pneumatic tire according to claim 4, wherein an amount of overlap between the inner liner layer and the coating rubber layer is greater than or equal to 5 mm and less than or equal to 10 mm.

7. The pneumatic tire according to claim 4, wherein a rubber composition in at least a region of the tie rubber layer where the tie rubber layer and the inner liner layer overlap contains:

a rubber component, a condensation product of a compound represented by the Formula (1) and formaldehyde, a methylene donor, and a vulcanizing agent;

a compounded amount of the condensation product is from 0.5 to 20 parts by mass relative to 100 parts by mass of the rubber component; and a proportion of a compounded amount of the methylene donor to the compounded amount of the condensation product is from 0.5:1 to 10:1.

8. The pneumatic tire according to claim 1, wherein the rubber component contains a diene rubber, the vulcanizing agent is sulfur, and the rubber composition further contains a vulcanization accelerator;

a compounded amount of the condensation product is from 0.5 to 3 parts by mass relative to 100 parts by mass of the rubber component; a compounded amount of the methylene donor is from 0.25 to 30 parts by mass relative to 100 parts by mass of the rubber component;

a compounded amount of the sulfur is less than 4 parts by mass relative to 100 parts by mass of the rubber component; and a compounded amount of the vulcanization accelerator is greater than 0 parts by mass and less than 2.1 parts by mass relative to 100 parts by mass of the rubber component.

9. The pneumatic tire according to claim 8, wherein the vulcanization accelerator is a compound having a sulfenamide structure; and a compounded amount of the compound having a sulfenamide structure is greater than 0 parts by mass and less than 1.5 parts by mass.

10. The pneumatic tire according to claim 9, wherein the rubber composition contains, as vulcanization accelerators, a compound having a sulfenamide structure and a compound having a thiuram structure; and a compounded amount of the compound having a thiuram structure is greater than 0 parts by mass and less than 0.6 parts by mass.

11. The pneumatic tire according to claim 1, wherein the thermoplastic resin is at least one type selected from the group consisting of polyvinylalcohol, an ethylene-vinyl alcohol copolymer, nylon 6, nylon 66, nylon 11, nylon 12, nylon 610, nylon 612, nylon 6/66, nylon MXD6, and nylon 6T.

12. The pneumatic tire according to claim 1, wherein the thermoplastic elastomer composition is a composition in which an elastomer component is dispersed in a thermoplastic resin component;

the thermoplastic resin component is at least one type selected from the group consisting of polyvinylalcohol, an ethylene-vinyl alcohol copolymer, nylon 6, nylon 66, nylon 11, nylon 12, nylon 610, nylon 612, nylon 6/66, nylon MXD6, and nylon 6T; and the elastomer component is at least one type selected from the group consisting of a brominated isobutylene-p-methylstyrene copolymer, a maleic anhydride-modified ethylene-α-olefin copolymer, an ethylene-glycidyl methacrylate copolymer, and a maleic anhydride-modified ethylene-ethylacrylate copolymer.

13. The pneumatic tire according to claim 1, wherein, in the Formula (1), at least one of $R^1$, $R^2$, $R^3$, $R^4$, and $R^5$ is an alkyl group having from 1 to 8 carbons, and the others are hydrogens or alkyl groups having from 1 to 8 carbons.

14. The pneumatic tire according to claim 1, wherein the condensation product is a compound represented by Formula (2):

Formula 2

(2)

wherein, n is an integer from 1 to 5.

15. The pneumatic tire according to claim 1, wherein the condensation product is a compound represented by Formula (3):

Formula 3

(3)

wherein, m is an integer from 1 to 3.

16. The pneumatic tire according to claim 1, wherein, in the Formula (1), at least one of $R^1$, $R^2$, $R^3$, $R^4$, and $R^5$ is a hydroxyl group, and the others are hydrogens or alkyl groups having from 1 to 8 carbons.

17. The pneumatic tire according to claim 16, wherein
the thermoplastic resin contains an ethylene-vinyl alcohol copolymer having an ethylene content of 5 to 55 mol %; and
a compounded amount of the ethylene-vinyl alcohol copolymer is from 5 to 100 mass % of a total amount of the thermoplastic resin.

18. The pneumatic tire according to claim 16, wherein
the thermoplastic elastomer composition is a composition in which an elastomer component is dispersed in a thermoplastic resin component;
the thermoplastic resin component contains an ethylene-vinyl alcohol copolymer having an ethylene content of 5 to 55 mol %; and
a compounded amount of the ethylene-vinyl alcohol copolymer is from 5 to 100 mass % of a total amount of the thermoplastic resin component.

19. The pneumatic tire according to claim 1, wherein the methylene donor is at least one type selected from the group consisting of modified etherified methylolmelamine, paraformaldehyde, hexamethylene tetramine, pentamethylene tetramine, and hexamethoxy methylmelamine.

20. The pneumatic tire according to claim 1, wherein the diene rubber is styrene butadiene rubber.

21. The pneumatic tire according to claim 1, wherein the compounded amount of the condensation product is from 10 to 20 parts by mass relative to 100 parts by mass of the rubber component.

22. The pneumatic tire according to claim 1, wherein the proportion of the compounded amount of the methylene donor to the compounded amount of the condensation product is from 4.0:1 to 10:1.

* * * * *